United States Patent
Nagaya

(10) Patent No.: US 8,453,774 B2
(45) Date of Patent: Jun. 4, 2013

(54) IN-WHEEL MOTOR SYSTEM FOR A STEERING WHEEL

(75) Inventor: Go Nagaya, Tokyo (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 1298 days.

(21) Appl. No.: 10/530,180

(22) PCT Filed: Oct. 2, 2003

(86) PCT No.: PCT/JP03/12639
§ 371 (c)(1),
(2), (4) Date: Apr. 4, 2005

(87) PCT Pub. No.: WO2004/030971
PCT Pub. Date: Apr. 15, 2004

(65) Prior Publication Data
US 2006/0048978 A1 Mar. 9, 2006

(30) Foreign Application Priority Data

Oct. 2, 2002 (JP) .................................. 2002-290432

(51) Int. Cl.
*B60K 7/00* (2006.01)
(52) U.S. Cl.
USPC ..................................... 180/65.51; 180/65.6
(58) Field of Classification Search
USPC ............... 180/65.1, 65.6, 252, 253, 254, 256, 180/257
See application file for complete search history.

(56) References Cited

U.S. PATENT DOCUMENTS

| | | | | | |
|---|---|---|---|---|---|
| 1,780,870 | A | * | 11/1930 | Tenney | 118/423 |
| 2,635,704 | A | * | 4/1953 | Herreshoff | 180/256 |
| 3,347,333 | A | * | 10/1967 | Edwards | 180/65.6 |
| 3,468,389 | A | * | 9/1969 | Nelson | 180/65.6 |
| 3,472,331 | A | * | 10/1969 | Baker et. al. | 180/254 |
| 3,818,721 | A | * | 6/1974 | Wahlmark | 464/111 |
| 4,273,209 | A | * | 6/1981 | Orain | 180/254 |
| 4,504,099 | A | * | 3/1985 | Miki et al. | 384/543 |
| 4,541,819 | A | * | 9/1985 | Mazziotti | 464/144 |
| 5,048,859 | A | * | 9/1991 | Nishikuma et al. | 180/253 |
| 5,087,229 | A | * | 2/1992 | Hewko et al. | 475/149 |
| 5,180,180 | A | * | 1/1993 | Yamashita et al. | 180/253 |
| 5,224,563 | A | * | 7/1993 | Iizuka et al. | 180/65.3 |
| 5,791,995 | A | * | 8/1998 | Kudo et al. | 464/11 |
| 6,148,945 | A | * | 11/2000 | Alessandro et al. | 180/256 |
| 6,866,114 | B1 | * | 3/2005 | Villeneuve | 180/254 |
| 6,904,987 | B2 | * | 6/2005 | Haas et al. | 180/65.6 |

* cited by examiner

Primary Examiner — Frank Vanaman
(74) Attorney, Agent, or Firm — Sughrue Mion, PLLC

(57) ABSTRACT

An in-wheel motor system for mounting a direct drive motor to a steering wheel comprises a first knuckle 4 which is connected to the non-rotary side of a geared motor 3 by a connection member 10 having elastic bodies and direct-moving guides for limiting movement to a vertical direction and locked in a steering direction by upper and lower suspension arms 5a and 5b and a second knuckle 7 which is connected to a steering rod 8 and fitted with a brake unit 9 and a wheel 2 through a hub 6. This second knuckle 7 is connected to the above first knuckle 4 in such a manner that it can turn on a king pin axis J in the steering direction and to the output shaft of the above geared motor 3 by a connection shaft 20 having constant velocity joints 21 and 22 at both ends, thereby reducing an increase in steering torque.

6 Claims, 9 Drawing Sheets

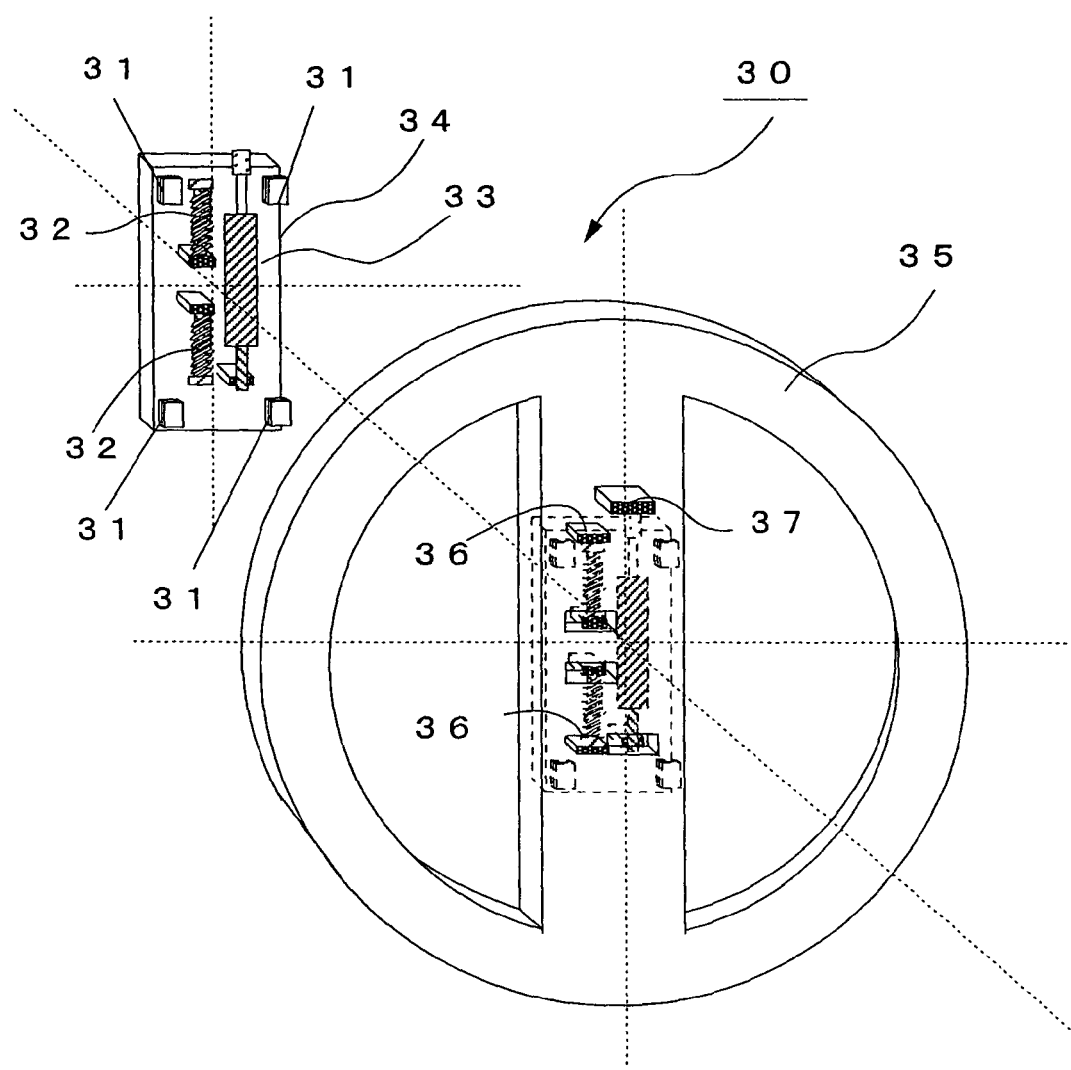

IN-WHEEL MOTOR SYSTEM FOR A STEERING WHEEL

BACKGROUND OF THE INVENTION

1. Field of the Invention

The present invention relates to an in-wheel motor system for a steering wheel for use in a vehicle having direct drive wheels as steering wheels.

2. Description of the Prior Art

In recent years, in a vehicle driven by a motor such as an electric car, an in-wheel motor system which incorporates a motor composed of a knuckle as a frame dress-up part and a drive motor in wheels has been employed due to its high space efficiency and drive force transmission efficiency (for example, U.S. Pat. No. 2,676,025, JP-A 9-506236 and JP-A 10-305735) (the term "JP-A" as used herein means an "unexamined published Japanese patent application").

However, since the motor is fixed to a knuckle which is a frame dress-up part of the vehicle in the above in-wheel motor system of the prior art, when an in-wheel motor is used in the steering wheel, the motor turns in a steering direction together with the wheel at the time of steering. That is, as the inertia moment on the steering axis of the steering wheel provided with the in-wheel motor increases due to the mass of the motor, not only does the steering torque becomes large but also the resonance in the steering direction easily occurs.

In a vehicle having a suspension mechanism such as a spring, it is known that as the mass of unsprung parts such as a wheel, knuckle and suspension arm so called "unsprung mass" increases, variations in the ground contact force of a tire become larger and the road holding properties become worse when the vehicle runs on a rough road. In the in-wheel motor of the prior art, as the motor is fixed to the knuckle as described above, the above unsprung mass increases by the mass of the motor with the result that variations in the ground contact force of the tire become larger and the road holding properties become worse.

It is an object of the present invention which has been made in view of the above problems of the prior art to provide an in-wheel motor system for a steering wheel which can reduce an increase in the steering torque of a steering wheel provided with an in-wheel motor.

SUMMARY OF THE INVENTION

According to a first aspect of the present invention, there is provided an in-wheel motor system for mounting a direct drive motor to a steering wheel, comprising a first knuckle which is connected to the non-rotary side of the direct drive motor and locked in a steering direction and a second knuckle which is connected to a steering rod and to the first knuckle in such a manner that it can turn on a king pin axis in the steering direction and fitted with a brake unit and the steering wheel. Thereby, as the in-wheel motor does not turn in the steering direction at the time of steering, the steering torque of the steering wheel can be reduced without fail.

According to a second aspect of the present invention, there is provided an in-wheel motor system for a steering wheel, wherein the non-rotary side of the motor is connected to the first knuckle by elastic bodies and dampers, or elastic bodies having a spring or damper function. Thereby, the motor is float mounted to a frame dress-up part to function as the weight of a dynamic damper, thereby making it possible to improve the ground contact performance of the tire and riding comfort.

According to a third aspect of the present invention, there is provided an in-wheel motor system for a steering wheel, wherein the non-rotary side of the motor is supported by direct-moving guides and a buffer member in the vertical direction of a vehicle. Thereby, variations in the ground contact pressure of the tire at the time of driving on a rough road and the road holding properties of the vehicle can be improved.

According to a fourth aspect of the present invention, there is provided an in-wheel motor system for a steering wheel, wherein the non-rotary side of the motor is supported by direct-moving guides and a buffer member in the horizontal direction of a vehicle in addition to the vertical direction. Thereby, variations in the longitudinal force of the tire can be reduced and the tire performance can be stabilized.

According to a fifth aspect of the present invention, there is provided an in-wheel motor system for a steering wheel, wherein the output shaft of the motor and a wheel support hub mounted to the second knuckle are interconnected by constant velocity joints. Thereby, even when the motor shaft becomes eccentric from the wheel shaft by steering drive force can be transmitted from the motor to the wheel without fail.

According to a sixth aspect of the present invention, there is provided an in-wheel motor system for a steering wheel, wherein the rotary portion of the motor and the wheel are interconnected by a flexible coupling having at least two direct-moving guides connected to each other in such a manner that their moving directions cross each other in the axial direction of the motor and a constant velocity joint-like coupling which has the center of its movement on a king pin axis. Thereby, even when a hollow type direct drive motor which cannot directly transmit the revolution of the motor to the hub due to its structure is used as the in-wheel motor, drive force can be transmitted from the motor to the wheel without fail.

BRIEF DESCRIPTION OF THE DRAWINGS

FIG. 5 is a diagram of an example of a shock absorber according to Embodiment 2;

DESCRIPTION OF THE PREFERRED EMBODIMENTS

Preferred embodiments of the present invention will be described hereinunder with reference to the accompanying drawings.

Embodiment 1

Figure 1:
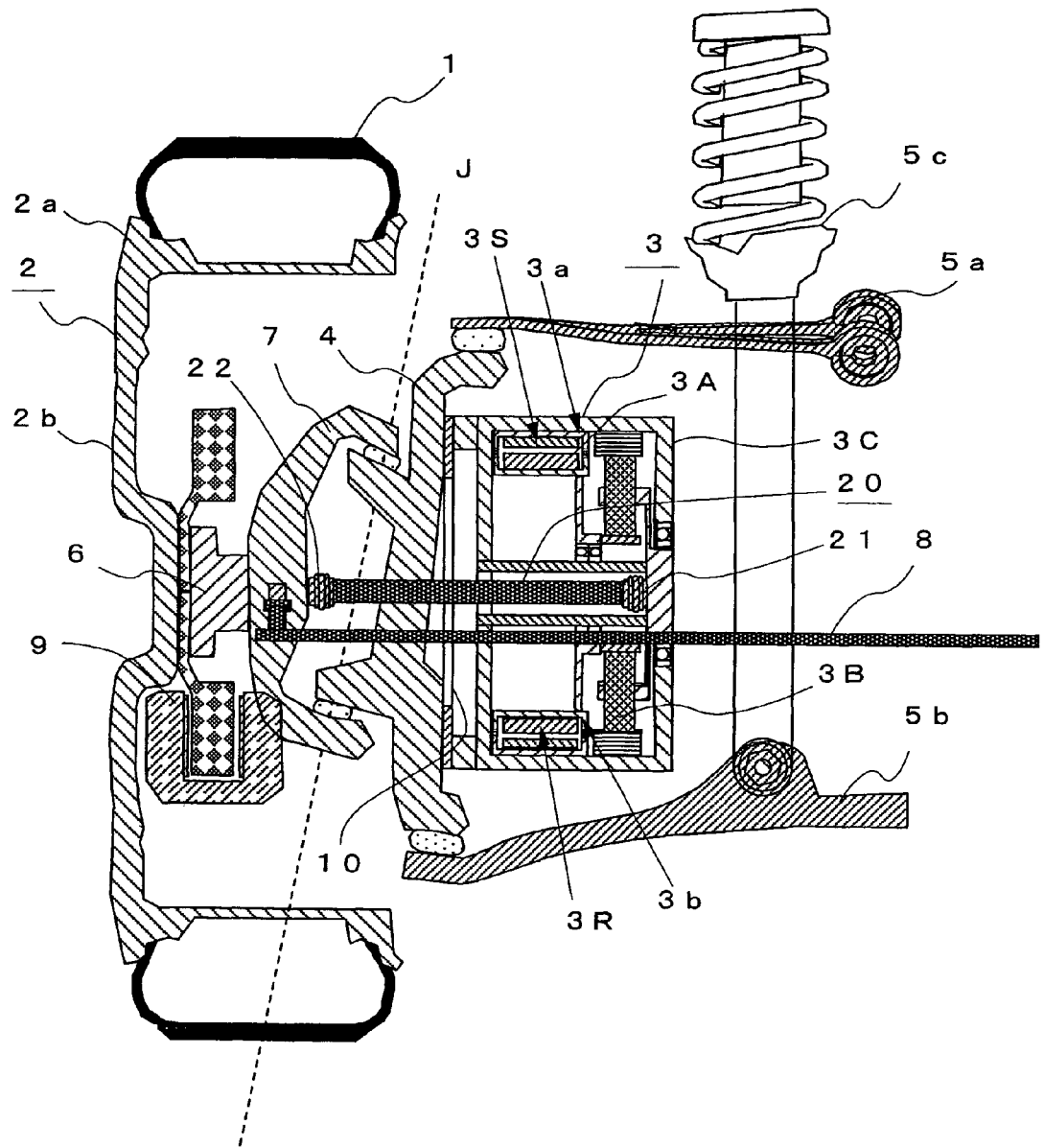
FIG. 1 is a longitudinal sectional view of an in-wheel motor system for a steering wheel according to Embodiment 1 of the present invention.

FIG. 1 is a diagram showing the constitution of an in-wheel motor system for a steering wheel according to Embodiment 1. In FIG. 1, reference numeral 1 denotes a tire, 2 a wheel composed of a rim 2a and a wheel disk 2b, 3 a geared motor comprising an electric motor 3A and a planetary speed reducer 3B in a motor case 3C, 4 a first knuckle which is fitted with the above geared motor 3 and connected to upper and lower suspension arms 5a and 5b, 6 a wheel support hub which is connected to the wheel 2 at its rotation axis, 7 a second knuckle which is connected to a steering rod 8 and to the first knuckle 4 in such a manner that it can turn on a king pin axis J in the steering direction. A brake unit 9 and the above wheel 2 are mounted to the second knuckle 7 through the above wheel support hub 6.

That is, the in-wheel motor system for a steering wheel of the present invention is constituted such that the knuckle consists of the first knuckle 4 locked in the steering direction and the second knuckle 7 mounted to the wheel 2 and connected to the steering rod 8, the geared motor 3 is mounted to the above first knuckle 4, and the first knuckle 4 and the second knuckle 7 are rotatably interconnected in the steering direction. Denoted by 5c is a suspension member composed of a shock absorber or the like.

Figure 2A:
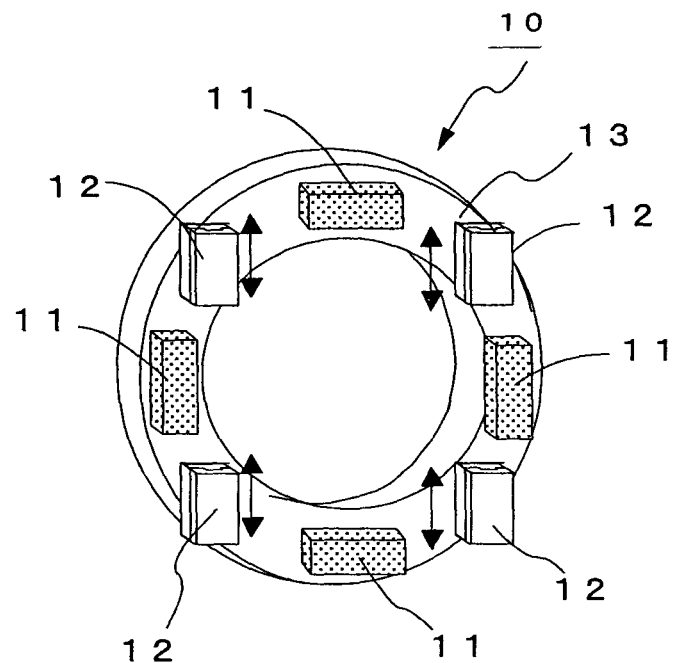
FIGS. 2(*a*) and 2(*b*) are diagrams showing an example of a connection member according to Embodiment 1 of the present invention.
Figure 2B:
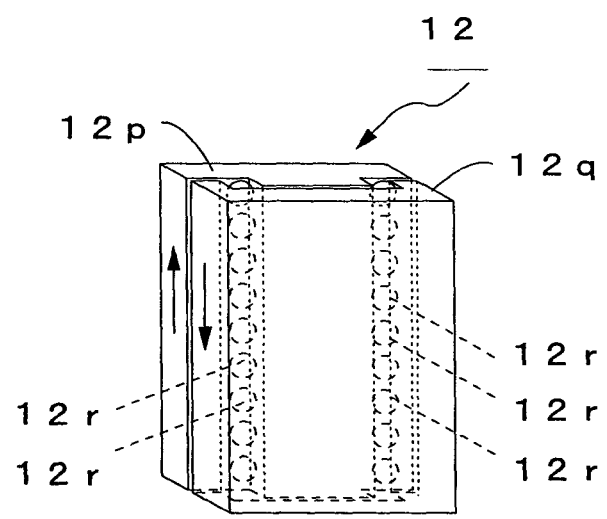

More specifically, the above geared motor 3 is an inner rotor type in-wheel motor in which a non-rotary case 3a for supporting the stator 3S of the electric motor 3A is connected to the motor case 3C and a rotary case 3b for supporting a rotor 3R is connected to the planetary speed reducer 3B. The above motor case 3C is connected to the above first knuckle 4 by a connection member 10 having elastic bodies 11 and direct-moving guides 12 for limiting movement to the vertical direction arranged on a hollow disk-like plate 13 as shown in FIG. 2(a), and the output shaft (motor output shaft) of the above planetary speed reducer 3B is connected to the above second knuckle 7 by a connection shaft 20 having constant velocity joints 21 and 22 at both ends.

Each of the direct-moving guides 12 for limiting movement to the vertical direction comprises a guide rail 12p having a projecting portion extending in the vertical direction and a guide member 12q having a recessed portion to be mated with the above guide rail 12p. To slide the above guide rail 12p and the guide member 12q smoothly, a plurality of steel balls 12r may be put between the projecting portion of the above guide rail 12p and the recessed portion of the guide member 12q.

The geared motor 3 is mounted to the first knuckle 4 which is supported by the upper and lower suspension arms 5a and 5b and locked in the steering direction as described above, and the first knuckle 4 is connected to the second knuckle 7 which is linked to the wheel support hub 6 and the steering rod 8 in such a manner that it can turn on the king pin axis J in the steering direction. Therefore, the geared motor 3 which is an in-wheel motor does not turn in the steering direction together with the wheel 2 at the time of steering unlike the prior art. Consequently, the steering torque does not increase, thereby making it possible to reduce the steering torque of the steering wheel without fail.

Since the second knuckle 7 connected to the wheel support hub 6 and the output shaft of the geared motor 3 are interconnected by the connection shaft 20 having constant velocity joints 21 and 22 at both ends in this embodiment, drive force can be transmitted from the motor 3 to the wheel 2 even at the time of steering without fail.

Further, since the above first knuckle 4 and the motor case 3C to which the non-rotary case 3a for supporting the stator 3S of the above geared motor 3 is fixed are interconnected by the connection member 10 having the elastic bodies 11 and the direct-moving guides 12 for limiting movement to the vertical direction in this embodiment, the geared motor 3 is float mounted to an unsprung portion which is a frame dress-up part of the vehicle. Therefore, the mass of the motor is separated from the unsprung mass of the vehicle and functions as the weight of a so-called dynamic damper, whereby it cancels unsprung vibration at the time of driving on a rough road, thereby making it possible to reduce variations in the ground contact force of the tire and to improve the road holding properties of the vehicle. A vibration load on the geared motor 3 at the time of driving on a bad road can be reduced.

According to Embodiment 1, the knuckle consists of the first knuckle which is connected to the non-rotary side of the geared motor 3 by the connection member 10 having elastic bodies 11 and direct-moving guides 12 for limiting movement to the vertical direction and locked in the steering direction by the upper and lower suspension arms 5a and 5b and the second knuckle 7 which is connected to the steering rod 8 and fitted with the brake unit 9 and the wheel 2 through the hub 6, the second knuckle 7 is connected to the first knuckle 4 in such a manner that it can turn on the king pin axis J in the steering direction, and the above second knuckle 7 and the output shaft of the above geared motor 3 are interconnected by the connection shaft 20 having constant velocity joints 21 and 22 at both ends. Therefore, even at the time of steering, the rotation of the geared motor 3 in the steering direction can be suppressed, the steering torque of the steering wheel can be greatly reduced, and drive force can be transmitted without fail.

The motor case 3C which is the non-rotary portion of the geared motor 3 is mounted to the above first knuckle 4 by the connection member 10 having elastic bodies 11 and direct-moving guides 12 for limiting movement to the vertical direction so that the mass of the motor functions as the weight of a dynamic damper, thereby making it possible to reduce variations in the ground contact force of the tire and to improve the road holding properties of the vehicle.

Embodiment 2

Figure 3:
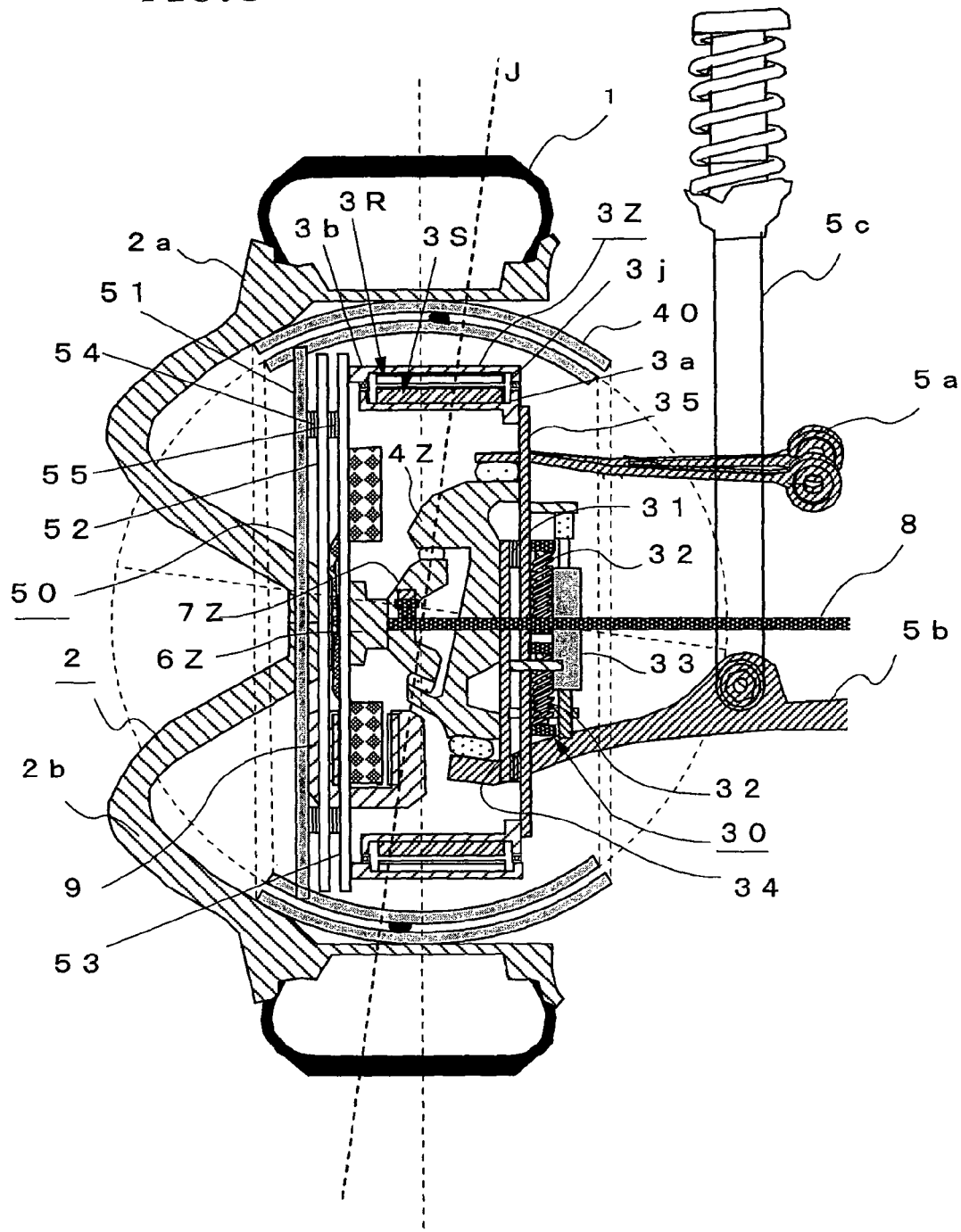
FIG. 3 is a longitudinal sectional view of an in-wheel motor system for a steering wheel according to Embodiment 2 of the present invention.
Figure 4:
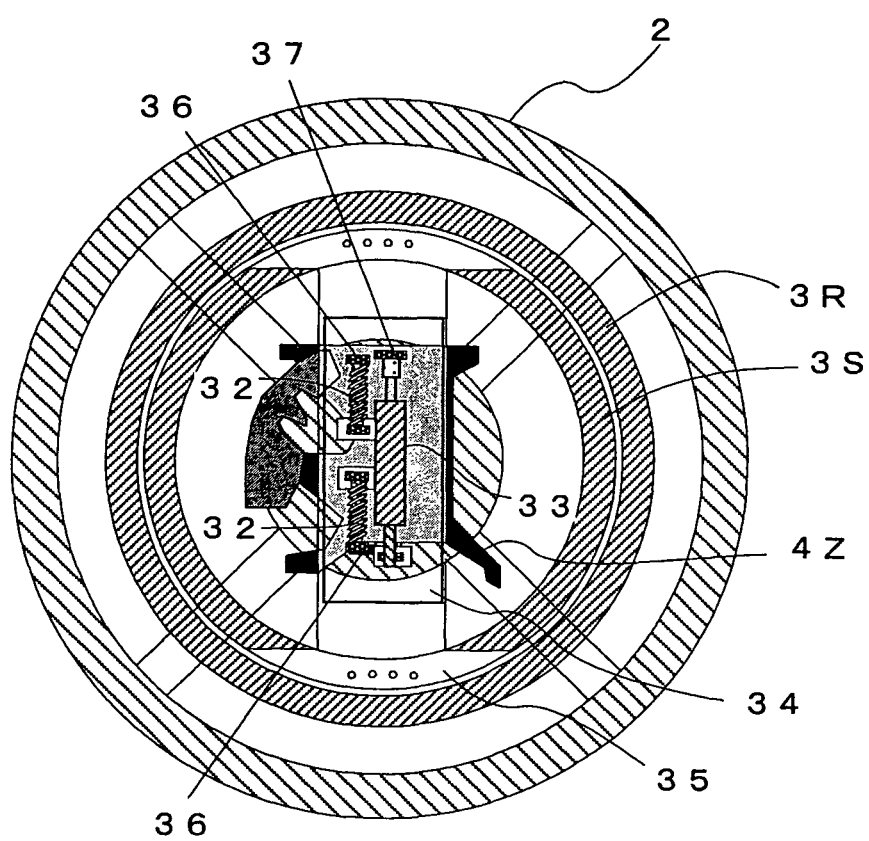
FIG. 4 is a front view of the in-wheel motor system according to Embodiment 2.

In the above Embodiment 1, the in-wheel motor is the geared motor 3. Even when a hollow type direct drive motor 3Z constituted such that a stator 3S is mounted on a first annular case (non-rotary case) 3a which is open on the outer side in the radial direction, a rotor 3R is mounted on a second annular case (rotary case) 3b which is open on the inner side in the radial direction and arranged concentric to the above non-rotary case 3a on the outer side in the radial direction of the non-rotary case 3a with a predetermined space between it and the above stator 3S, and the above non-rotary case 3a and the rotary case 3b are rotatably interconnected by a bearing 3j is mounted as shown in FIG. 3 and FIG. 4, the knuckle consists of a first knuckle 4Z which is connected to the non-rotary side of the above motor 3Z by a shock absorber 30 and locked in the steering direction by upper and lower suspension arms 5a and 5b and a second knuckle 7Z which is connected to the steering rod 8 and fitted with the brake unit 9 and the wheel 2 through a hub 6Z, and the second knuckle 7Z is connected to the first knuckle 4Z in such a manner that it can turn on the king pin axis J in the steering direction. Thereby, the above motor 3Z can be float mounted to an unsprung portion which is a frame dress-up part of the vehicle, and drive force can be transmitted from the above motor 3Z to the wheel 2 at the time of steering without fail.

As shown in FIG. 5, the above shock absorber 30 comprises two plates 34 and 35 which are interconnected by springs 32 and 32 and a damper 33 movable in the vertical direction of the vehicle and whose moving directions are limited to the vertical direction of the vehicle by direct-moving guides 31. That is, since the shock absorber 30 is constituted such that the two springs 32 and 32 which expand and contract in the vertical direction of the vehicle and the damper 33 which expands and contracts in the vertical direction of the vehicle are installed on the knuckle attachment plate 34 connected to the first knuckle 4Z and that spring receiving portions 36 are installed at positions above or below the above springs 32 and a damper attachment portion 37 is installed at a position above the damper 33 on the motor attachment plate 35 connected to the non-rotary case 3a of the motor 3Z, the above motor attachment plate 35 and the knuckle attachment plate 34 can be guided in the vertical direction of the vehicle and the above motor 3Z can be restricted to the vertical moving direction while attenuation force is generated. Thereby, the motor 3Z can be float mounted to an unsprung portion which is a frame dress-up part of the vehicle and accordingly, the mass of the above motor 3Z is separated from the unsprung mass of the vehicle and functions as the weight of a so-called dynamic damper. Therefore, unsprung vibration at the time of driving on a rough road is canceled, thereby making it possible to reduce variations in the ground contact force of the tire and to improve the road holding properties of the vehicle.

The hollow type direct drive motor 3Z cannot transmit the revolution of the motor to the hub 6Z directly due to its structure. In this embodiment, a flexible coupling 50 which can be eccentric from the shaft of the motor in the vertical direction and a constant velocity joint-like coupling 40 which can turn in the steering direction are used to interconnect the motor rotary portion and the wheel 2 so as to transmit the drive force of the above motor 3Z to the wheel 2.

That is, since the shaft of the above motor 3Z becomes eccentric from the shaft of the wheel in the vertical direction, the flexible coupling 50 which can be eccentric from the shaft in the vertical direction is used to transmit drive force. As the above flexible coupling 50 and the wheel 2 must be made free from each other in the steering direction at this point, the constant velocity joint-like coupling 40 which has the center of its movement at the intersection point between the king pin axis J and the wheel shaft is installed between the above flexible coupling 50 and the wheel 2.

Thereby, drive force can be transmitted from the motor 3Z to the wheel 2 without increasing the steering torque at the time of steering.

Figure 6A:
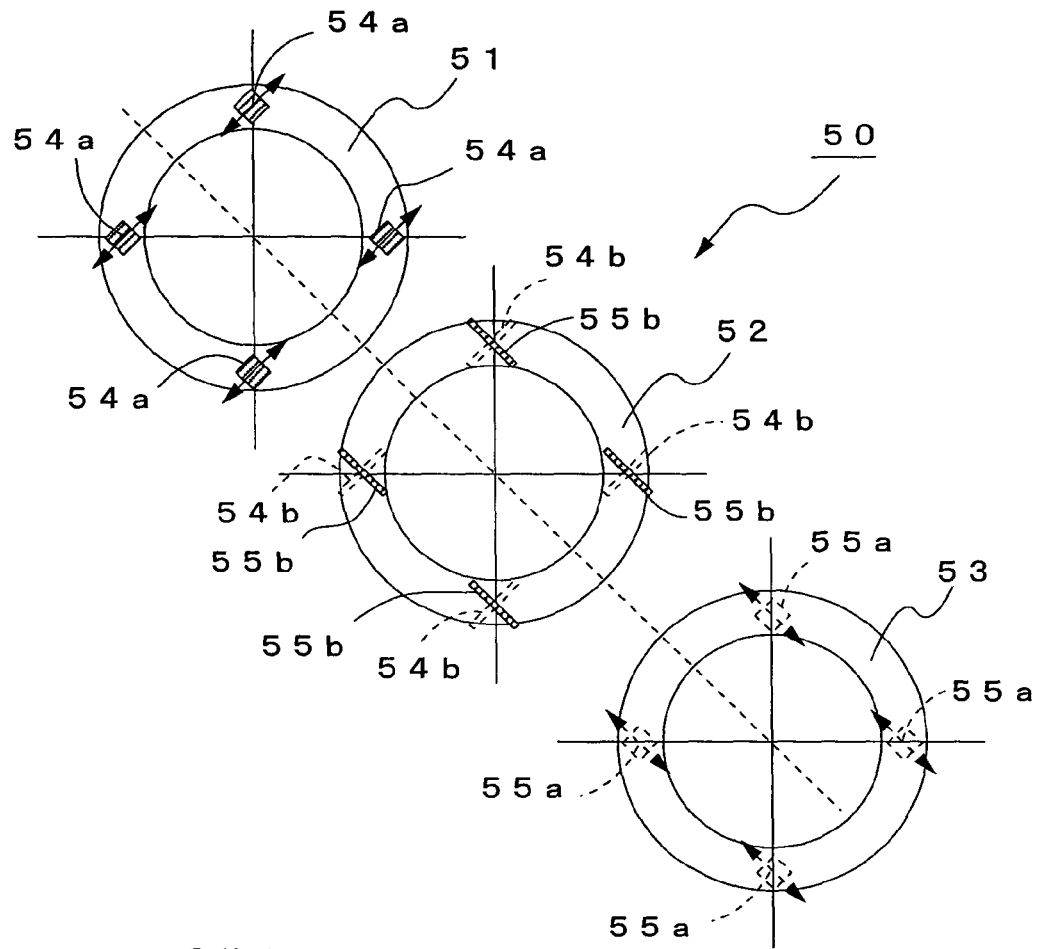
FIGS. 6(*a*) and 6(*b*) are diagrams of an example of a flexible coupling.
Figure 6B:
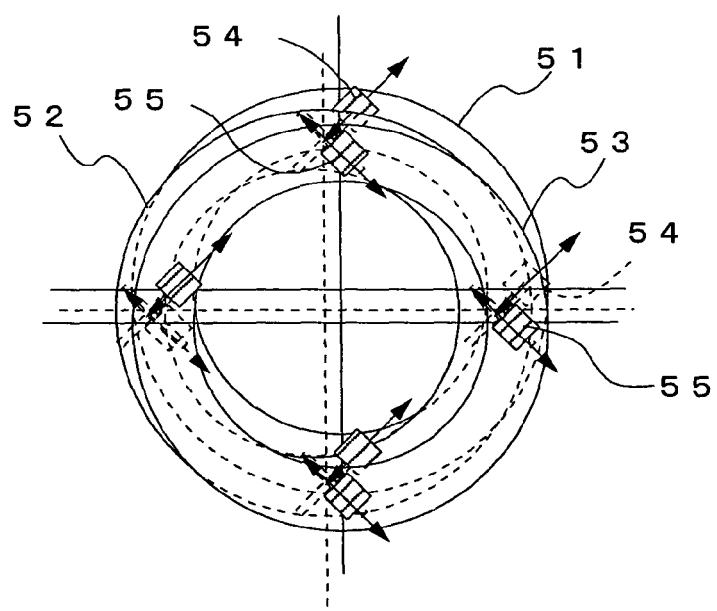

FIG. 6(a) shows an example of the above flexible coupling 50. This flexible coupling 50 comprises a hollow disk-like plate (wheel side plate) 51 which is situated on the wheel 2 side and whose periphery is connected to the inner side of the above constant velocity joint-like coupling 40, a hollow disk-like plate (motor side plate) 53 which is situated on the motor 3Z side and connected to the rotary case 3b of the motor 3Z, and a hollow disk-like plate (intermediate plate) 52 which is connected to the above wheel-side plate 51 by a direct-moving guide 54 and to the above motor side plate 53 by a direct-moving guide 55, the direct-moving guide 54 consists of guide members 54a and guide rails 54b, the direct-moving guide 55 consists of guide members 55a and guide rails 55b movable in a direction perpendicular to the moving direction of the above direct-moving guide 54, and all of the above direct-moving guides are mounted on the motor 3Z side plate and the wheel 2 side plate and on the front and rear sides of the intermediate plate at the same positions at intervals of 90°. Although force for turning in the peripheral direction and force for expanding in the radical direction are applied to the above intermediate plate 52 as shown in FIG. 6(b), as the direct-moving guide 54 which moves in a direction perpendicular to the moving direction of the above direct-moving guide 55 is installed on the rear side (wheel 2 side) of the above direct-moving guide 55 of the above intermediate plate 52, force for expanding the above intermediate plate 52 in the radial direction is balanced with the force for expanding in the radial direction of the above direct-moving guide 54 with the result that only torque is transmitted to the wheel side plate 51. Therefore, torque input into the direct-moving guide 55 from the motor side plate 53 connected to the rotary case 3b is transmitted to the wheel side plate 51 through the above intermediate plate 52, whereby the drive force of the above motor 3Z can be transmitted to the wheel 2 without fail.

Figure 7:
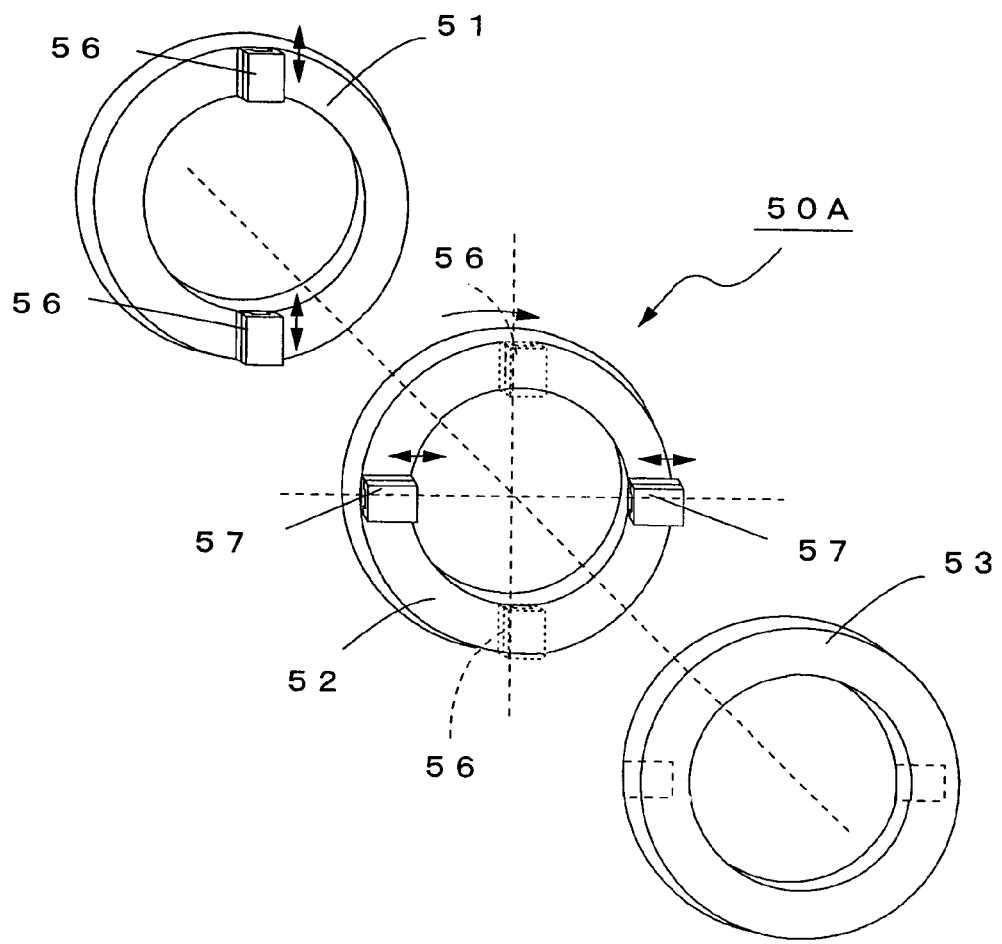
FIG. 7 is a diagram of another example of the flexible coupling.

A flexible coupling 50A in which the above hollow disk-like plates 51 to 53 are interconnected by direct-moving guides 56 and 57 whose moving directions are perpendicular to each other as shown in FIG. 7 may be used in place of the above flexible coupling 50.

Figure 8:
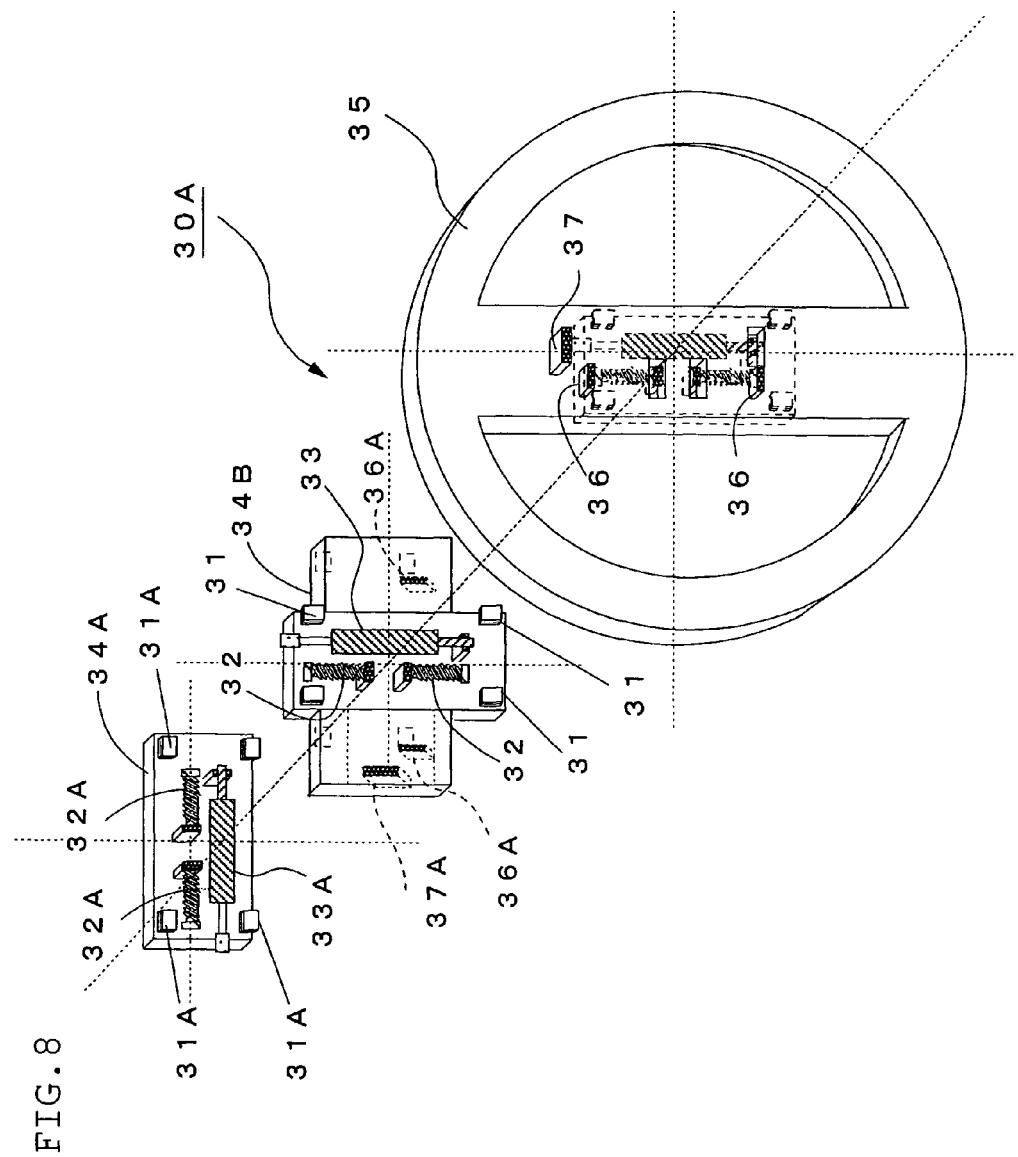
FIG. 8 is a diagram of another example of the shock absorber according to the present invention.

In the above Embodiment 2, the motor 3Z is supported in the vertical direction of the vehicle by the shock absorber 30. When a shock absorber 30A constituted such that two springs 32A and 32A which expand and contract in the horizontal direction of the vehicle and a damper 33A which expands and contracts in the horizontal direction of the vehicle are installed on a first plate 34A connected to the first knuckle 4Z, a second plate 34B having spring receiving portions 36A installed at positions above or below the above springs 32A and a damper attachment portion 37A installed at a position above the above damper 33A on the first plate 34A side and two springs 32 and 32 expanding and contracting in the vertical direction of the vehicle and a damper 33 expanding and contracting in the vertical direction of the vehicle on the motor attachment plate 35 side is interposed between the above first plate 34A and the motor attachment plate 35 connected to the non-rotary case 3a of the motor 3Z, the above first plate 34A and the above second plate 34B are interconnected by a direct-moving guide 31A for guiding the above plates 34A and 34B in the horizontal direction of the vehicle, and the above second plate 34B and the motor attachment plate 35 having spring receiving portions 36 installed at positions above or below the above springs 32 and a damper attachment portion 37 installed at a position above the damper 33 are interconnected by a direct-moving guide 31 for guiding the above plates 34B and 35 in the vertical direction of the vehicle as shown in FIG. 8 is used in place of the above shock absorber 30, the above motor 3Z can be float mounted in the horizontal direction of the vehicle in addition to the vertical direction of the vehicle, whereby the above motor 3Z functions as the weight of a dynamic damper not only in the vertical direction but also in the horizontal direction of the vehicle. Therefore, since unsprung vibration at the time of driving on a rough road can be canceled to reduce variations in the ground contact force of the tire, thereby making it possible to improve the road holding properties of the vehicle and also to reduce variations in the longitudinal force of the tire. As a result, the performance of the tire can be stabilized.

Figure 9:
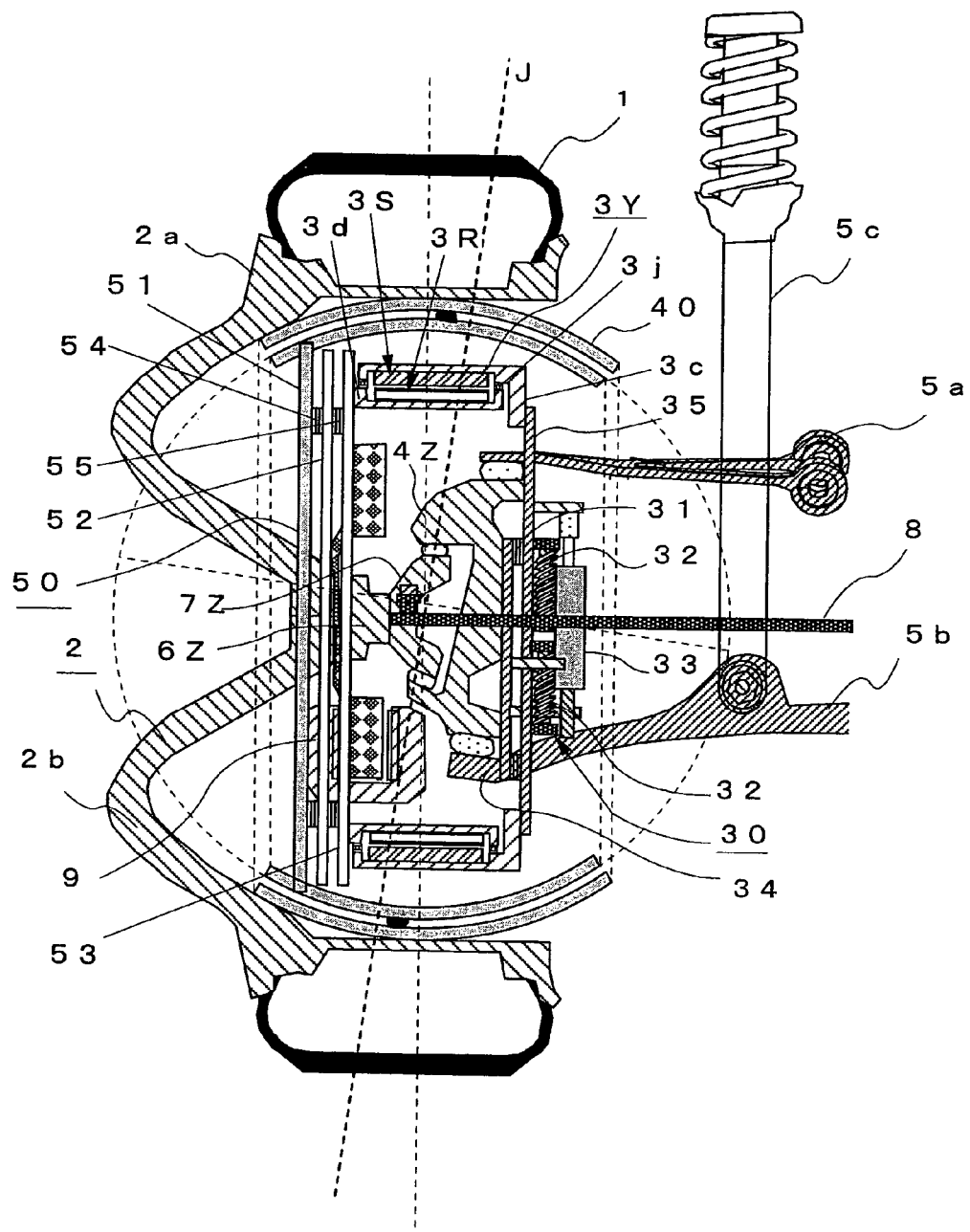
FIG. 9 is a longitudinal sectional view of another in-wheel motor system for a steering wheel according to the present invention.

In the above embodiment, an outer rotor type in-wheel motor is mounted as the hollow type direct drive motor 3Z. An inner rotor type in-wheel motor 3Y as shown in FIG. 9 may be mounted in place of the above motor 3Z. In FIG. 9, reference symbol 3c denotes the non-rotary case of the in-wheel motor 3Y to which the stator 3S is mounted and 3d denotes a rotary case which is arranged on the inner side in the radial direction of the above non-rotary case 3c and rotatably connected to the above non-rotary case 3c by a bearing 3j and to which the rotor 3R is mounted.

INDUSTRIAL FEASIBILITY

As having been described above, according to the present invention, an in-wheel motor system for mounting a direct drive motor to a steering wheel comprises a first knuckle locked in a steering direction and a second knuckle which is connected to a steering rod and to the first knuckle in such a manner that it can turn on a king pin axis in the steering direction and fitted with a brake unit and a steering wheel, and the direct drive motor is mounted to the first knuckle. Since the in-wheel motor does not turn in the steering direction at the time of steering, an increase in inertia moment on the steering shaft can be greatly suppressed and the steering torque of the steering wheel can be reduced without fail.

Since the non-rotary side of the above motor is connected to the first knuckle by elastic bodies and dampers, or elastic bodies having a spring or damper function and the above motor functions as the weight of a dynamic damper, the ground contact performance of the tire and riding comfort can be improved.

What is claimed is:

1. An in-wheel motor system for mounting a direct drive motor to a wheel, comprising
    a first knuckle which is connected to an upper suspension arm, a lower suspension arm and a non-rotary side of the direct drive motor, and is locked in a steering direction; and
    a second knuckle which is connected to a steering rod and to the first knuckle in such a manner that the second knuckle turns on a king pin axis in the steering direction and is fitted with a brake unit and the wheel.

2. The in-wheel motor system for a wheel according to claim 1, wherein the non-rotary side of the motor is connected to the first knuckle by elastic bodies and dampers, or elastic bodies having a spring or damper function.

3. The in-wheel motor system for a wheel according to claim 2, wherein the non-rotary side of the motor is supported by direct-moving guides and a buffer member in the vertical direction of a vehicle.

4. The in-wheel motor system for a wheel according to claim 3, wherein the non-rotary side of the motor is supported by direct-moving guides and a buffer member in the horizontal direction of a vehicle in addition to the vertical direction.

5. The in-wheel motor system for a wheel according to any one of claims 2 to 4, wherein the output shaft of the motor and a wheel support hub mounted to the second knuckle are interconnected by constant velocity joints.

6. The in-wheel motor system for a wheel according to any one of claims 2 to 4, wherein the rotary portion of the motor and the wheel are interconnected by a flexible coupling having at least two direct-moving guides connected to each other in such a manner that their moving directions cross each other in the axial direction of the motor and a constant velocity joint coupling which has the center of its movement on a king pin axis and turns in the steering direction.

* * * * *